United States Patent [19]
Fitzmaurice et al.

[11] 3,971,930
[45] July 27, 1976

[54] POLARIZATION COMPENSATOR FOR OPTICAL COMMUNICATIONS

[75] Inventors: Michael W. Fitzmaurice, Gambrills, Md.; James B. Abshire, Greeneville, Tenn.

[73] Assignee: The United States of America as represented by the Administrator of the National Aeronautics and Space Administration, Washington, D.C.

[22] Filed: Apr. 24, 1974

[21] Appl. No.: 463,925

[52] U.S. Cl. ............................................. 250/199
[51] Int. Cl.² ......................................... H04B 9/00
[58] Field of Search ........... 250/199, 201, 206, 216, 250/225

[56] References Cited
UNITED STATES PATENTS

| | | | |
|---|---|---|---|
| 3,284,632 | 11/1966 | Niblack et al. | 250/199 |
| 3,415,995 | 12/1968 | Kerr | 250/199 |
| 3,457,414 | 7/1969 | Ragen et al. | 250/199 |
| 3,471,803 | 10/1969 | Forster | 250/199 |
| 3,532,891 | 10/1970 | Simmons et al. | 250/199 |

Primary Examiner—Robert L. Griffin
Assistant Examiner—Jin F. Ng
Attorney, Agent, or Firm—Robert F. Kempf; Robert D. Marchant; John R. Manning

[57] ABSTRACT

An optical data communication system is provided whereby two orthogonal polarization states of a light beam carrier correspond to digital states. In such a system, automatic polarization compensation is provided by applying a dither modulating voltage to a cell exhibiting the electro-optic effect. The cell controls the relative phase of electric field components of an input light beam enabling the dither frequency component of the difference of the instantaneous powers in the two polarization states to be coherently detected. A signal derived from the coherent detection process is fed back to the cell via an integrator to form polarization bias compensating servo loop of Type I.

13 Claims, 5 Drawing Figures

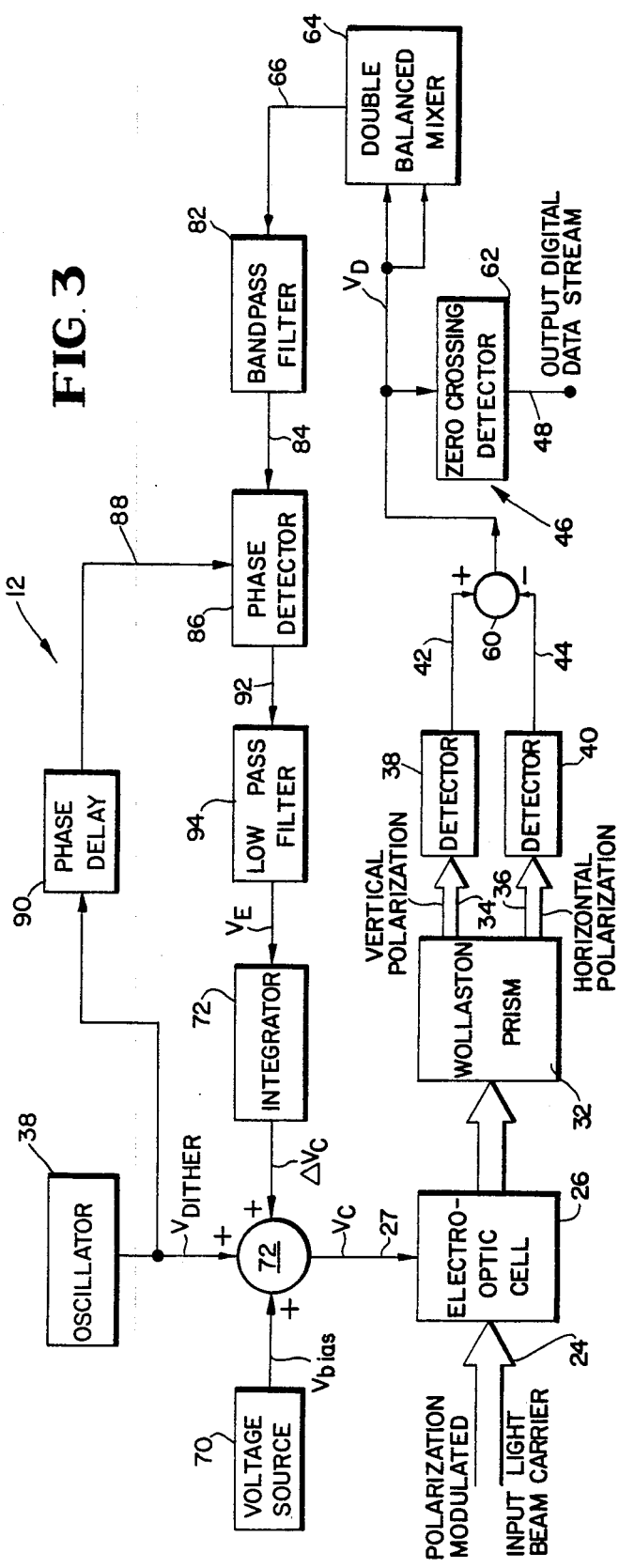
FIG. 3
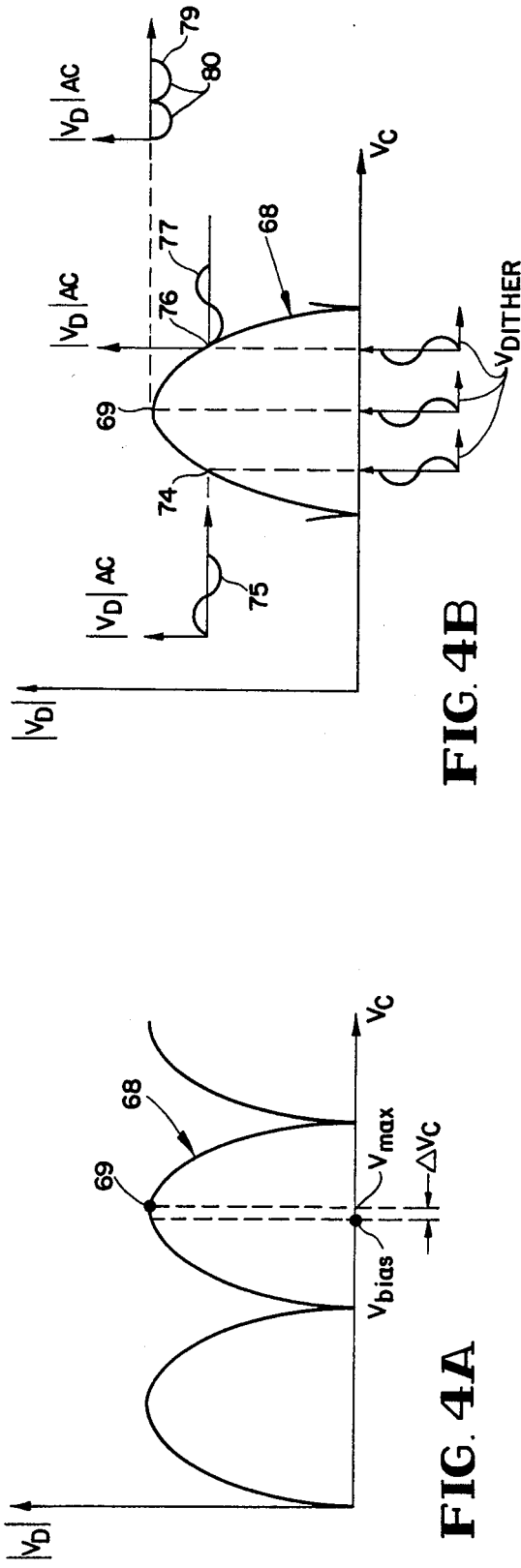
FIG. 4B
FIG. 4A

POLARIZATION COMPENSATOR FOR OPTICAL COMMUNICATIONS

ORIGIN OF THE INVENTION

The invention described herein was made by employees of the U.S. Government and may be manufactured and used by or for the Government for governmental purposes without the payment of royalties thereon or therefor.

FIELD OF THE INVENTION

The invention relates generally to optical communications and more particularly to optical communication systems employing polarization modulation. In its most particular aspects, the invention relates to the compensation of a two state polarization modulated light beam for polarization biases which produce crosstalk between the two polarization states.

BACKGROUND OF THE DISCLOSURE

The advent of the laser has stimulated a great deal of interest in the prospect of transmitting information on an optical carrier. Two major advantages are gained by the use of an optical carrier; namely extremely high rate of information transmission and higher transmission efficiency. The first and second advantages result from the extremely high frequency of the optical carrier and the narrow beam of the energy whereby increased directivity occurs so that a substantially larger fraction of energy transmitted from a small aperture transmitter reaches a receiver than is generally possible with radio frequency or microwave carriers.

One technique which has been proposed for impressing digital information on a light beam carrier is the modulation of the light beam between two orthogonal polarizations in accordance with a serial digital data stream. For example, a digital one corresponds to one polarization state and a digital zero corresponds to a second polarization state which is orthogonal to the first. Examples of orthogonal polarization states are two linear perpendicular polarization states and two circular polarization states of opposite rotation sense.

In the transmission of such a polarization modulated light beam over an optical path which includes the atmosphere and perhaps other mediums, it is anticipated that the atmosphere, which may act as a non-linear and somewhat random transmission medium, and other non-linear mediums will distort the transmitted polarization states in a random manner putting some of the power of an intended transmitted polarization state, corresponding for example to a digital one, into the other polarization state, corresponding to an unintended digital zero. When power is received in both polarization states crosstalk is said to be present. If, for example, perpendicular linear polarization states, such as horizontal and vertical linear polarizations, are transmitted, nonlinear mediums can be expected to randomly distort these linear states to elliptically polarized states. Since elliptically polarized light has components of both horizontal and vertical polarized light, the difficulty encountered at a receiver in determining whether a digital one or a digital zero was transmitted should be apparent. This difficulty is made further acute when it is considered that various inherent noise components at the receiver also influence the decision process. As the difference between the powers in the intended and unintended polarization states becomes small and approaches the rms receiver noise there is a significant probability that some of the decisions will be made in error. Thus, polarization crosstalk seriously degrades the performance of a polarization modulated system.

Polarization crosstalk can also be introduced by optical components at the transmitter. For example, changes in the optical alignment or orientation of the transmitting laser and its associated modulator can cause crosstalk. In addition, the characteristics of the electro-optic modulator at the transmitter are temperature sensitive. Furthermore, rotating optical elements at the receiver may vary the polarization of the received optical signal causing crosstalk.

Heretofore, control techniques have been suggested in the prior art for stabilizing the output polarization of an electro-optic modulator in association with a laser. Two such prior art control techniques are disclosed in U.S. Pat. No. 3,284,632 to Niblack et al. and U.S. Pat. No. 3,532,891 to Simmons et al. These prior art control techniques are not, in general, adaptable for compensating for polarization biases introduced in the entire optical path including the atmosphere and the receiver, particularly in the transmission of arbitrarily fast data rates. Furthermore, these prior art control techniques are not independent of the state of the intended digital data.

SUMMARY OF THE INVENTION

An automatic polarization compensating system is provided by the present invention wherein an electro-optic cell, such as a Pockels cell or a Kerr cell, is interposed in the optical path of an input light beam which is modulated between two orthogonal polarization states. The cell has a pair of electrodes and a voltage thereon for adjusting the relative phase retardation between two linear polarization components of the input light beam, which components are characterized by electric fields lying along two perpendicular cell axes. In particular, when vertical and horizontal linear polarization states are transmitted, these cell axes are rotated at 45° from the system of axes defined by the horizontal and vertical polarization states. If the light beam is distorted due to a polarization bias introduced by the atmosphere or other medium in the optical path of the light beam, the voltage across the cell is automatically adjusted to compensate for the polarization bias by introducing the proper amount of differential phase retardation along the crystal axes to restore the light beam linear polarization states.

After passing through the crystal, the light beam falls on a polarization dependent beam splitter, such as a Wollaston prism, which splits the light beam into two paths. Horizontally polarized light travels along one of the paths and vertically polarized light travels along the other path. The two paths terminate at two optical detectors for simultaneously and separately detecting the power in each of the horizontal and vertical polarization states. A comparison of the electrical outputs of these two detectors is made by deriving an a.c. signal proportional to the difference between the powers in the two orthogonal polarization states. This difference signal is rectified to a unidirectional signal, which is then maximized by cyclically dithering the electro-optic crystal voltage a small amount and coherently detecting the resultant variation of the rectifying circuit output. Coherent detection is used to obtain an error signal which includes indications of polarity, as well as magnitude. This error signal is coupled to the crystal electrodes via an integrator to form a type I polarization bias correcting feedback loop.

When right circular and left circular are the orthogonal polarization states transmitted, the compensating system of the invention need only be augmented with a quarter-wave plate ahead of the Wollaston prism. The quarter-wave plate converts the orthogonal circular polarization states to orthogonal linear polarization states.

OBJECTS OF THE INVENTION

It is an object of the present invention to provide a system for compensating for polarization biases which produce crosstalk between the orthogonal polarization states of a received polarization modulated light beam.

It is a further object of the present invention to provide a new and improved polarization bias compensating system which is self-regulating and automatic.

It is a further object of the present invention to provide a receiver for recovering the digital data impressed on a polarization modulated light beam that may arrive at the receiver with polarization crosstalk.

It is still a further object of the present invention to provide a polarization bias compensating system in conjunction with a receiver for rapidly modulated light.

It is yet another object of the present invention to provide a system for compensating a digital polarization modulated light beam carrier which does not require knowledge of the intended digital state carried by the light beam.

Other objects, features and advantages of the present invention will become apparent upon a perusal of the following detailed description of one main embodiment of the present invention in conjunction with the appended drawing.

BRIEF DESCRIPTION OF THE DRAWING

FIG. 3 is a detailed schematic diagram of the receiver portion of FIG. 1, showing the locations of voltage signals $V_D$, $V_E$, $V_C$, $V_{Dither}$, $V_{Bias}$, and $\Delta V_C$, where the latter three voltage signals are components of $V_C$.

FIG. 4A is a plot of the absolute value of $V_D$ versus $V_C$, wherein the $V_{Bias}$ and $\Delta V_C$ components are illustrated.

FIG. 4B is a plot similar to FIG. 4A illustrating the a.c. portion $|V_D|_{A.C.}$ of the ordinate of FIG. 4A in response to $V_{Dither}$ at three different illustrative values of $V_C$.

DETAILED DESCRIPTION OF THE DRAWINGS

Figure 1:
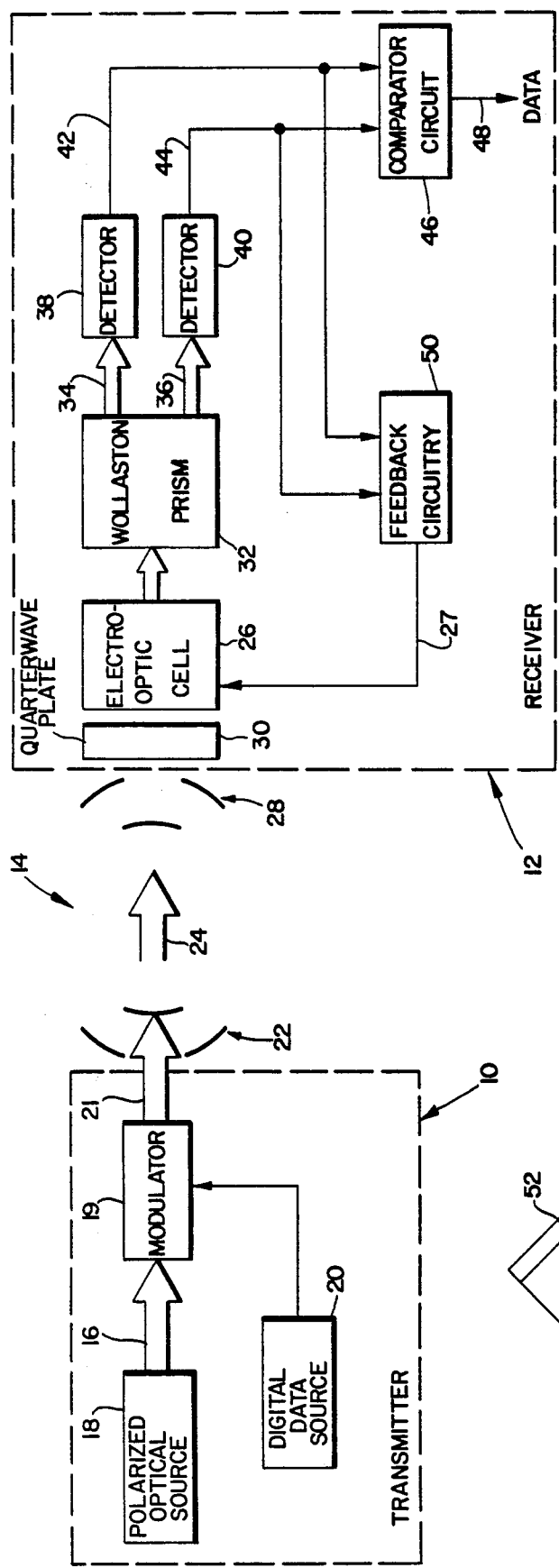
FIG. 1 is a schematic diagram of the system of the present invention for communicating with polarization modulated light having optically aligned transmitter and receiver portions.

Referring to FIG. 1, the system of the present invention for digital optical communications comprises an aligned optical transmitter 10 and optical receiver 12 which are separated by a random transmission medium 14, such as a long atmospheric path. At the transmitter 10, the light output 16 of a polarized optical source 18, such as a laser, is modulated between two orthogonal polarization states by electro-optic modulator 19 at a high data rate (up to about 500 Megabits per second) in accordance with the serial digital data from source 20 to be transmitted. Source 20 electrically drives modulator 19, a conventional electro-optic modulator, such as a Pockels cell or a Kerr cell. Modulator 19 is suitably biased to produce two orthogonal polarization states, such as right and left circular or horizontal and vertical linear polarization, in response to a pair of output voltage levels of the source 20 in correspondence to binary one and zero values. Thus, for example, an instantaneous horizontal polarization may indicate a binary one and an instantaneous vertical polarization a binary zero. A light beam 21 derived from modulator 19 is suitably collimated by collimating optics 22, such as a telescope or lens system of appropriate aperture, to produce a desired directivity light beam carrier 24 traversing the transmission medium 14 to the receiver 12. In some applications, where a laser is the light source 18, it is possible to omit the collimating optics, wherein the rather small divergence of the laser output determines the transmitter directivity.

It is expected that, in traversing the transmission medium 14, different phase retardations will be encountered by light having different polarizations. As a result, the transmitted polarization states are expected to be distorted to elliptical polarization states by the time the light beam carrier 24 arrives at the receiver 12. Since elliptical polarization has components of both right and left circular polarization and of both horizontal and vertical polarization, crosstalk is present. For example, if two linear orthogonal polarization states, such as horizontal and vertical, are sequentially transmitted by the transmitter 10 in accordance with a sequence of digital data from source 20 the receiver simultaneously detects energy in both horizontal and vertical polarization states as a result of this distortion. In order to compensate for such distortions or polarization biases, the receiver 12 includes an electro-optic cell or crystal 26 through which the incident light 14 passes after being collected by a suitable telescope or lens system 28. The electro-optic cell 26, which may be similar in construction to the polarization modulator 19, cancels or compensates for distortion by introducing a differential phase retardation between perpendicular polarization components of the incident radiation 24 in response to an electric signal derived on lead 27.

If right circular and left circular are the orthogonal transmitted polarizations of light beam carrier 24, these states are converted to linear polarization states by a quarter wave plate 30 between the collecting or receiving optics 28 and the cell 26. After passing through cell 26 the light beam carrier impinges on a polarization separator, such as a Wollaston prism 32, to respectively direct horizontal and vertically polarized optical energy along different spaced apart or diverging optical paths 34 and 36. Optical signals travelling along paths 34 and 36 respectively impinge upon matched optical detectors 38 and 40, e.g. photo-diodes, for respectively transducing the optical signals to electric signals on leads 42 and 44.

The electric signals on leads 42 and 44 are coupled to a comparator circuit 46 having a digital output 48 indicative of which of the two electric signals supplied to it has the greater magnitude and consequently which of the two orthogonal polarization states was most likely transmitted. Electrical signals 42 and 44 are also fed to feedback circuitry 50 which derives the signal on lead 27 for controlling the differential phase retardation introduced by electro-optic cell 26. The differential phase retardation introduced by cell 26 is such that at any instant of time substantially all of the received optical signal energy impinges on only one of the detectors 38 and 40 thus substantially decreasing the probability of an erroneous digital indication at the decision circuit output 48.

Figure 2:
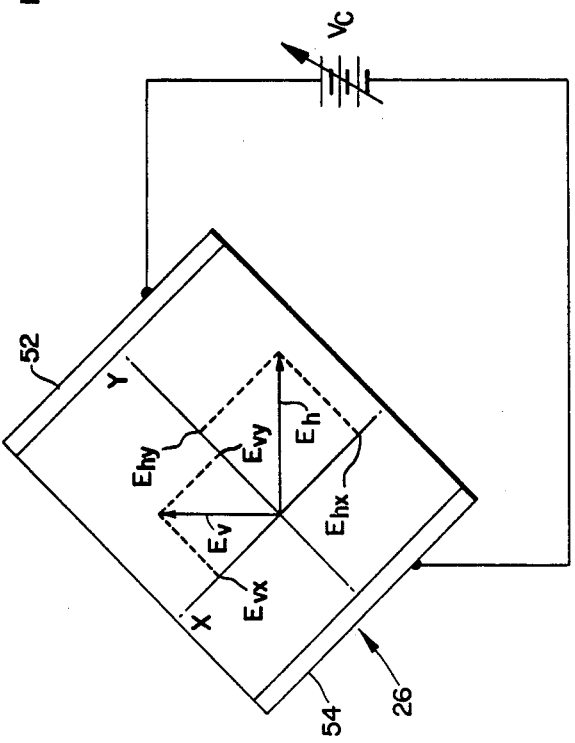
FIG. 2 is a view of an electro-optic cell included in the receiver portion of FIG. 1 along the axis of beam propagation in which the pertinent transverse axes and polarization components are shown.

The electro-optic cell 26 is illustrated in greater detail in FIG. 2. Cell 26 has a pair of orthogonal transverse reference axes X and Y and a pair of opposed planar electrodes 52 and 54 to which the reference axes X and Y are respectively parallel and perpendicular. The incident light beam carrier 24 passes through cell 26 perpendicular to the X and Y axes. The variable signal $V_C$ on lead 27, FIG. 3 is applied across electrodes 52 and 54 and includes a constant d.c. or bias component ($V_{bias}$), a fixed a.c. component ($V_{dither}$), and a slowly varying d.c. component ($\Delta V_C$) that is a function of the difference of the signals derived from detectors 38 and 40. As the voltage of signal $V_C$ is varied, the difference in phase retardation experienced by incident light electric field components along the axes X and Y is varied. When the cell 26 is a Pockels cell, the differential phase retardation is a linear function of the voltage $V_C$, if the compensator is a Kerr cell, the differential phase retardation is a quadratic function of $V_C$.

The linearly polarized wave derived from transmitter 10 includes, at different times, horizontal and vertical electric field components ($E_h$ and $E_v$), both of which are displaced at the transmitter by 45° from the crystal reference axes X and Y. If the transmission medium between transmitter 10 and receiver 12 is linear, $E_h$ and $E_v$ are respectively received at receiver 12 as a pair of equal amplitude components, $E_{h,x}$, $E_{h,y}$, $E_{v,x}$ and $E_{v,y}$, along the X and Y axes. When the corresponding X and Y polarization components of input radiation such as $E_{h,x}$ and $E_{h,y}$ are in phase with each other, the input radiation is linearly polarized. However, when corresponding X and Y polarization components are out of phase with each other due to non-linearities in the transmission medium, the input radiation is elliptically polarized and is characterized by a rotating electric field vector. For example, circularly polarized input radiation produces X and Y polarization components which are ninety degrees out of phase with each other.

In operation, incident light on cell 26 which may have been distorted from linear orthogonal polarization states to elliptical polarization states is substantially restored to linear polarization states by the introduction, in response to voltage $V_C$, of the correct amount of differential phase retardation so that the corresponding X and Y polarization components are "in phase" with each other at the output of cell 26. Actually the polarization components of one linear polarization state are in phase, while the polarization components of the other state are 180° out of phase. Thus, "in phase" is intended to mean either 0° or 180° dependent on the state of digital data.

FIG. 3 is a block diagram of comparator circuit 46 and the optimizing, feedback circuitry 50 of FIG. 1. Both circuits include a differencing network 60 (such as a differential amplifier) responsive to the detector output electrical signals on leads 42 and 44 to form an electrical difference signal $V_D$ proportional to the difference of the signals derived from photodetectors 38 and 40 on leads 42 and 44. The comparator circuit 46 further includes a zero crossing detector 62 which is fed by difference signal $V_D$ for comparing $V_D$ to zero. Zero crossing detector 62 has a pair of output digital states in correspondence with the difference signal being either positive or negative.

Feedback circuitry 50 is also responsive to signal $V_D$ and operates to maximize the value of $|V_D|$ so that at any time all the energy of the incident light beam carrier is directed to one of the detectors 38 or 40. In particular, since $V_D$ is positive for one transmitted digital state and negative for the other state it is necessary to maximize the absolute value of $V_D$ so that the operation of feedback circuitry 50 is independent of which digital state is instantaneously being transmitted.

In order to produce a signal on lead 66 which is proportional to the magnitude of $V_D$ but always has the same polarity (e.g. positive) regardless of the $V_D$, $V_D$ is applied to an absolute value circuit 64, such as a full wave rectifier or a analog squaring circuit which may be a mixer or multiplier in which both inputs thereof are fed by $V_D$. Since circuit 64 should have a bandwidth at least equal to the data rate of digital source 20, a double balanced mixer is preferable for high data rate applications. On output lead 66 of rectifying circuit 64, there is derived a narrow-band, low frequency signal having an amplitude proportional to the difference in amplitude of the two polarization components supplied to detectors 38 and 40. This controls the amplitude of the variable signal supplied to lead 27 as well as to cell 26 to control the phase retardation of the wave passing through the cell.

Before considering the remainder of the circuitry for deriving the signal on lead 27 consideration is given to the manner in which cell 26 functions in response to the level ($V_C$) of the signal on lead 27 by referring to FIG. 4A wherein there is illustrated a curve 68 of the absolute value of the output signal of difference circuit 60 ($|V_D|$) versus the value of $V_C$. Curve 68 has a shape that is essentially a rectified sinusoidal function, provided cell 26 is a Pockels cell, and has a maximum 69 when $V_C$ is a particular value $V_{max}$. $|V_D|$ is dependent upon the distortion undergone by the transmitted polarization state and therefore is subject to substantial variation along the $V_C$ axis as changes in the transmission medium occur. The feedback circuitry of FIG. 3 includes a bias voltage source 70 having the output fixed d.c. signal $V_{bias}$, means for generating the variable compensating d.c. signal "$\Delta V_C$" and analog adder means 72 for adding $V_{bias}$ and $\Delta V_C$. Adder means 72 may comprise an operational amplifier or the signals $V_{bias}$ and $\Delta V_C$ may be coupled to (with one of the signals inverted) the different electrodes 52 and 54 to produce an output voltage $V_C$ across the cell 26 which is equal to $V_{max}$ and also to the sum of $V_{bias}$ and $\Delta V_C$.

The variable portion, $\Delta V_C$, of compensating voltage $V_C$ is derived from the output of integrator 72 which is fed by an error signal voltage, $V_E$, indicative of the displacement of the instantaneous value of $V_C$ from $V_{max}$. Thus, since the optimizing circuitry 50 includes a single integrator, it is a Type I control loop, and the signal $\Delta V_C$ can be non-zero when the error signal $V_E$ is zero.

The error signal $V_E$ is essentially a measure of the slope or derivative of the curve 68 at the instantaneous value of $V_C$. Note that when $V_C$ equals $V_{max}$, the slope of the curve is zero. Similarly, the slope of the curve 68 is positive at points 74 on the left side of maximum 69 and is negative at points 76 on the right side of maximum 69. Thus, the slope of curve 68 is a suitable error signal since it is an odd function of $V_C$ about $V_{max}$.

The signal $V_E$ is generated by including a relatively small amplitude dither, cyclical waveform, such as a sinusoid or square wave from oscillator 38, which furnishes the $V_{dither}$ component of the signal $V_C$ applied to the electro-optic compensator 26. The oscillator 78 preferably has a frequency which is significantly less than the digital data rate but significantly higher than the correction bandwidth of feedback circuitry, such as 1-100 khz. $V_{dither}$ is applied to lead 27 via the adder means 72. By synchronously and coherently detecting the fundamental dither component of the output of the unidirectional circuit 66, the slope is measured.

In FIG. 4B there are illustrated the a.c. portions $|V_D|_{a.c.}$, of the absolute value of $V_D$ resulting from the superposition of the constant sinusoidal dither signal, $V_{dither}$, upon three illustrative d.c. values of $V_C$ corresponding to the points 74, 69 and 76. Since the slope of curve 68 at point 74 is negative, the resultant $|V_D|_{a.c.}$ variation waveform 75 is 180° out of phase with $V_{dither}$, while the resultant a.c. variation waveform 77 from point 72 is in phase with the dither variation. Note also that when the dither variation is centered around maximum point 69, the resultant $|V_D|_{a.c.}$ waveform 79 is a full wave rectified configuration including a pair of identical negative-going humps 80 in each cycle of $V_{dither}$ at maximum point 69; thereby waveform 79 has a finite d.c. component, a zero component at the fundamental frequency and finite, non-zero components at even harmonics of $V_{dither}$. It should be apparent that the amplitude and phase of the fundamental of $|V_D|_{a.c.}$ is a measure of the instantaneous displacement of $V_C$ from $V_{max}$.

Referring again to FIG. 3, the fundamental component of $|V_D|_{a.c.}$ derived from rectifier 64 is detected by applying the signal on lead 66 to a bandpass filter 82 having a passband centered about the frequency of $V_{dither}$ and stop bands for all harmonics of $V_{dither}$, as well as for d.c. The output 84 of filter 82 is applied to and coherently detected in a phase detector 86, which may be a mixer or synchronous rectifier. Phase detector 86 is also responsive to a reference signal on lead 88, which signal is preferably either a sinusoidal replica of $V_{dither}$ or a square wave at the dither frequency. The signal on lead 88 is the output of a phase delay circuit 90 to which $V_{dither}$ is applied. When the signal on lead 88 is a square wave, the phase delay circuit 90 may include a zero crossing detector responsive to an analog delaying element, such as an RC network. The phase delay of circuit 90 compensates for various circuit delays encountered in the signal path from lead 27 to the output lead 84 of filter 82 and is set so that both inputs to phase detector 86 have zero crossings at the same time, i.e., the reference wave on lead 88 is in phase with the output of filter 82 at the dither frequency fundamental, whereby the phase detector functions as an analog multiplier.

The output signal of phase detector 86 has a d.c. component with an amplitude and polarity indicative of the amplitude and sign (0° or 180° phase) of the fundamental of $|V_D|_{a.c.}$. A.C. components in the output signal of detector 86 are removed by applying the detector output signal to low pass filter 94 that forms the d.c. error signal $V_E$ which is commensurate with the d.c. component derived from detector 86.

The dynamics of the compensating circuitry are determined by various parameters, such as feedback loop gain and the bandwidth of filters 82 and 94. These parameters are selected by well known servo-mechanism design techniques to obtain desired relatively narrow band dynamic characteristics of compensating circuit 50.

Having described one embodiment of the invention it is clear that numerous modifications are possible within its spirit and scope. For example, by the term electro-optic cell it is desired to include all cells having optical properties that provided the desired phase retardation in response to an electrical signal or command. Clearly cells responsive to electrical signals transduced to either acoustic or magnetic effects are comprehended by this definition. Therefore, it is intended that the invention be liberally construed and that the specific preferred embodiment disclosed be interpreted as illustrative and not in a limiting sense.

What is claimed is:

1. A method of transmitting digital data from a first site to a second site comprising: at the first site, polarization modulating an optical carrier from a polarizing energy source to a selected one of a pair of values in response to an input of a binary signal value from a binary signal producing means; transmitting the modulated carrier from the first site to the second site via an optical path that distorts the polarization state of the carrier in a random manner to introduce cross-talk between the polarizations for the binary signal values; receiving the carrier containing cross-talk at the second site; introducing a differential phase retardation on mutually orthogonal polarization components of the carrier when received at the second site in response to the amplitude of the polarization components of the received wave to remove the cross-talk from the carrier at the second site; and the step of introducing a differential phase retardation including the steps of; coupling the received carrier through an optical differential phase retardation cell, and controlling the cell by a feedback means so that optical waves of substantially only one linear polarization are coupled through it at a particular time instant when the optical carrier received at the second site has a first polarization corresponding to a first binary value.

2. The method of claim 1 wherein the cell is controlled by the feedback means by comparing amplitudes of two linear, orthogonal polarizations coupled through the cell in response to the received carrier, and varying the cell by the feedback means until the compared amplitudes differ from each other by a maximum amount.

3. A digital communication system comprising: an optical carrier source for transmitting polarized optical energy; means for polarization modulating said optical energy derived from said source to a selected one of a pair of values in response to an input of a binary signal value from a binary signal producing means; means for transmitting the modulated optical carrier to a remote site via an optical path; the optical path having a tendency to distort the transmitted polarizations in a random manner causing crosstalk between the polarizations for two binary values; an optical receiver at the remote site for receiving the modulated carrier; said receiver including means for detecting the polarization of the carrier received at the remote site; and said detecting means including; an optical differential phase retardation cell responsive to the received carrier for introducing a differential phase retardation on mutually orthogonal polarization components of the carrier when received at the second site in response to the amplitude of the polarization components of the received wave for substantially eliminating the cross-talk between the two polarization states, means responsive to optical energy derived from the received carrier coupled through the cell for deriving a control signal indicative of the relative amplitudes of the received carrier in the pair of polarizations, and a feedback means responsive to the control signal for controlling the cell by the feedback means so that optical waves derived from the received carrier of substantially only one polarization are coupled through the cell at a particular time instant to indicate a binary value.

4. The system of claim 3 wherein the control means includes means for maximizing differences between the amplitude of the pair of polarizations of the received carrier.

5. The system of claim 4 wherein the maximizing means includes means for applying a dither signal to the cell for superimposing the dither signal on the control signal, means for phase comparing a replica of the dither signal applied to the cell with the dither signal superimposed on the control signal to derive an error signal, and means responsive to the error signal for activating the cell to control the phase retardation of the optical energy passing through the cell.

6. The system of claim 4 wherein the feedback means includes an absolute value circuit responsive to the control signal.

7. A detector responsive to an optical carrier polarization modulated to a selected one of a pair of values in response to an input of a binary signal value from a binary signal producing means comprising: an optical receiver responsive to the optical carrier; the received optical carrier having a polarization state that is randomly distorted by an optical path terminating at the optical receiver relative to the polarization of the carrier as it was initially modulated in response to the binary signal valve causing cross-talk in the received carrier between the binary values; said receiver including means responsive to the optical carrier for substantially eliminating the cross-talk; and said responsive means including; an optical differential phase retardation cell responsive to the received carrier for introducing a differential phase retardation on mutually orthogonal components of the carrier when received at the second site in response to the amplitude of the polarization components of the received wave, means responsive to optical energy derived from the received carrier coupled through the cell for deriving a control signal indicative of the relative amplitude of the received carrier in the pair of polarizations, and a feedback means responsive to the control signal for controlling the cell by the feedback means so that optical waves derived from the received carrier of substantially only one polarization are coupled through the cell at a particular time instant to indicate a binary value.

8. The detector of claim 3 wherein the control means includes means responsive to the control signal for maintaining the cell responsively fixed in response to the control signal for indicating that the amplitude of the received carrier for one polarization is a maximum relative to the amplitude of the received carrier for the other polarization.

9. The detector of claim 7 wherein the control means includes means for maximizing differences between the pair of polarization of the received carrier.

10. The detector of claim 9 wherein the feedback means includes an absolute value circuit responsive to the control signal.

11. The detector of claim 9 wherein the maximizing means includes means for applying a dither signal to the cell for superimposing said dither signal on said control signal, means for phase comparing a replica of the dither signal applied to the cell with the dither signal superimposed on the control signal to derive an error signal, and means responsive to the error signal for activating the cell to control the phase retardation of the optical energy passing through the cell.

12. The detector of claim 11 wherein the means for activating includes means for integrating the error signal.

13. The detector of claim 11 wherein the feedback meand includes an absolute value circuit responsive to the control signal.

* * * * *